(12) United States Patent
Brees (10) Patent No.: US 8,899,032 B2
(45) Date of Patent: Dec. 2, 2014

(54) STATOR CENTERING PLATE

(75) Inventor: William Brees, Bay Village, OH (US)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 649 days.

(21) Appl. No.: 13/246,489

(22) Filed: Sep. 27, 2011

(65) Prior Publication Data

US 2012/0073278 A1    Mar. 29, 2012

Related U.S. Application Data

(60) Provisional application No. 61/386,989, filed on Sep. 27, 2010.

(51) Int. Cl.
*F16D 33/18* (2006.01)
*F16D 41/067* (2006.01)
*F16H 41/24* (2006.01)

(52) U.S. Cl.
CPC ............ *F16D 41/067* (2013.01); *F06D 41/066* (2013.01); *F16H 2041/246* (2013.01)
USPC .............................................. 60/345; 60/362

(58) Field of Classification Search
CPC ................ F16H 2041/246; F16D 2500/10493; F16D 33/04; F16D 33/18; F16D 33/20; F16D 41/066; F16D 41/067
USPC ................................................... 60/345, 362
See application file for complete search history.

(56) References Cited

U.S. PATENT DOCUMENTS

| | | | |
|---|---|---|---|
| 2,034,429 A | 3/1936 | De Lavaud | |
| 2,588,668 A | 3/1952 | Syrovy | |
| 2,755,628 A | 7/1956 | Mamo | |
| 3,014,430 A | 12/1961 | Schneider | |
| 3,244,400 A | 4/1966 | Saunders | |
| 3,284,881 A | 11/1966 | Clarke | |
| 3,354,643 A | 11/1967 | Paredes | |
| 3,385,060 A | 5/1968 | Lazarus | |
| 3,572,034 A | 3/1971 | Fisher | |

(Continued)

FOREIGN PATENT DOCUMENTS

| | | |
|---|---|---|
| DE | 1193758 | 5/1965 |
| DE | 3931427 | 4/1990 |

(Continued)

OTHER PUBLICATIONS

International Search Report for PCT/US2011/053490, mailed May 4, 2012 by Korean Intellectual Property Office.

*Primary Examiner* — Ned Landrum
*Assistant Examiner* — Logan Kraft
(74) *Attorney, Agent, or Firm* — Kathryn A. Warner; Kevin L. Parks (57) ABSTRACT

A stator assembly for a torque converter includes first and second blade plates, a one-way clutch assembly disposed axially between the blade plates and a centering plate. The one-way clutch assembly has an inner race with an outer circumferential surface, an outer race with an outer circumferential surface, and a plurality of blocking elements disposed radially between the inner race and the outer race. The centering plate includes a ring portion grippingly engaged with the outer race outer circumferential surface and an annular portion with an inner circumferential surface arranged to radially position the inner race outer circumferential surface. In an example embodiment, at least one of the blade plates is made by stamping.

16 Claims, 5 Drawing Sheets

(56) References Cited

U.S. PATENT DOCUMENTS

| | | |
|---|---|---|
| 4,377,068 A | 3/1983 | Braatz |
| 4,848,084 A | 7/1989 | Wirtz |
| 5,070,978 A | 12/1991 | Pires |
| 5,307,629 A | 5/1994 | By et al. |
| 5,449,057 A | 9/1995 | Frank |
| 5,465,575 A | 11/1995 | Shimmell |
| 5,577,586 A | 11/1996 | Buckendahl |
| 5,597,057 A | 1/1997 | Ruth et al. |
| 5,718,114 A | 2/1998 | Murata et al. |
| 5,737,836 A * | 4/1998 | Finn et al. .................... 29/889.5 |
| 5,806,643 A | 9/1998 | Fitz |
| 5,829,565 A | 11/1998 | Fergle et al. |
| 5,852,932 A | 12/1998 | Matsumoto |
| 5,853,073 A | 12/1998 | Costin |
| 5,918,715 A | 7/1999 | Ruth et al. |
| 6,026,642 A | 2/2000 | Myers |
| 6,505,721 B1 | 1/2003 | Welch |
| 6,568,180 B2 | 5/2003 | Maeda et al. |
| 6,571,926 B2 | 6/2003 | Pawley |
| 6,749,051 B2 | 6/2004 | Muramatsu |
| 6,793,060 B2 * | 9/2004 | Veitch ......................... 193/35 R |
| 6,911,047 B2 * | 6/2005 | Rockwood et al. ......... 623/19.13 |
| 6,993,903 B2 | 2/2006 | Shin |
| 7,770,707 B2 | 8/2010 | Brees et al. |
| 7,798,299 B2 * | 9/2010 | Schultz ....................... 192/3.27 |
| 7,802,668 B2 | 9/2010 | Peri et al. |
| 7,850,420 B2 | 12/2010 | Brees et al. |
| 7,854,588 B2 | 12/2010 | George et al. |
| 7,975,819 B2 * | 7/2011 | Altmann et al. ......... 192/45.006 |
| 2003/0223831 A1 * | 12/2003 | Viens et al. ..................... 408/60 |
| 2003/0226732 A1 | 12/2003 | Kamiya et al. |
| 2007/0137977 A1 * | 6/2007 | Peri et al. ................. 192/110 B |
| 2007/0220874 A1 | 9/2007 | Hemphill et al. |
| 2007/0220877 A1 | 9/2007 | George et al. |
| 2008/0308373 A1 | 12/2008 | Wiegert |
| 2009/0232655 A1 * | 9/2009 | Brees ........................... 416/180 |

FOREIGN PATENT DOCUMENTS

| | | |
|---|---|---|
| EP | 0276411 | 8/1988 |
| GB | 2042690 | 9/1980 |
| JP | 2008-157461 | 7/2008 |
| WO | 2004020874 | 3/2004 |

\* cited by examiner

STATOR CENTERING PLATE

FIELD

The invention relates generally to a stator centering plate, and more particularly to a stator centering plate for use with stamped torque converter stators.

BACKGROUND

Sheet metal stators are shown and described in commonly-owned United States Patent Publication nos. 2007/0224042, 2007/0220877 and 2009/0232655.

BRIEF SUMMARY

Example aspects broadly comprise a stator assembly for a torque converter including first and second blade plates, a one-way clutch assembly disposed axially between the blade plates, and a centering plate. The one-way clutch assembly has an inner race with an outer circumferential surface, an outer race with an outer circumferential surface, and a plurality of blocking elements disposed radially between the inner race and the outer race. The centering plate has a ring portion grippingly engaged with the outer race outer circumferential surface and an annular portion with an inner circumferential surface arranged to radially position the inner race outer circumferential surface. In an example embodiment, at least one of the blade plates is made by stamping.

In some example embodiments, one of the blade plates has an aperture and the other blade plate has an axial protuberance disposed in the aperture. In an example embodiment, the protuberance has a deformed portion arranged to fix the blade plates together. In some example embodiments, the second blade plate has the aperture and a notch radially aligned with and circumferentially offset from the protuberance. The centering plate ring portion has a tab disposed in the notch. The outer race is disposed axially between the second blade plate and the centering plate annular portion. In an example embodiment, the first blade plate has a radially extending portion for axially retaining the centering plate.

In some example embodiments, the second blade plate has an inner circumferential surface. The outer race circumferential surface has a serrated portion and a non-serrated portion. The serrated portion is assembled with the second blade plate inner circumferential surface and the non-serrated portion is assembled with the centering plate annular portion inner circumferential surface. In an example embodiment, the serrated portion is press-fit into the second blade plate inner circumferential surface.

In some example embodiments, the centering plate is made by stamping and the centering plate annular portion inner circumferential surface includes a shear length of at least seventy percent (70%). In an example embodiment, the centering plate is heat treated by ferritic nitrocarburizing, case hardening, or through hardening. In an example embodiment, the centering plate is made of aluminum or includes grooves. In an example embodiment, the first and/or second blade plate has at least a portion of a blade for guiding fluid in the torque converter. In an example embodiment, the first and/or second blade plate has an axially extending segment for positioning a bearing in the torque converter.

Other example aspects broadly comprise a stator assembly for a torque converter including a first stamped blade plate with a flow guiding portion, a second stamped blade plate having a flow guiding portion and a circumferential surface with a notch, a one-way clutch assembly and a stamped centering plate. The one-way clutch assembly is disposed axially between the blade plates and has an inner race with an outer circumferential surface, an outer race with an outer circumferential surface, and a plurality of blocking elements disposed radially between the inner race and the outer race. The outer race has a serrated portion pressed into the second blade plate circumferential surface, and a non-serrated portion. The stamped centering plate has a plurality of ring tabs grippingly engaged with the outer race smooth portion and extending into the notch, and an annular portion with a circumferential surface arranged to radially position the inner race circumferential surface.

In an example embodiment, the first blade plate has an aperture and the second blade plate has an axial protuberance extending from the circumferential surface and circumferentially offset from the notch. The protuberance is disposed in the aperture and includes a deformed portion arranged to fix the blade plates together.

Other example aspects broadly comprise a stator assembly for a torque converter including a first blade plate with a flow guiding portion and a potted portion, an outer race with an outer circumferential surface press-fitted into the potted portion, and a stamped centering plate at least partially disposed around the outer race outer circumferential surface. In an example embodiment, the first blade plate has a connecting portion with notches that connects the flow guiding portion and the potted portion. The centering plate includes tabs disposed around the outer race outer circumferential surface and extending into the notches.

In some example embodiments, the stator assembly has an inner race with an outer circumferential surface and a plurality of blocking elements disposed radially between the outer race and the inner race. The centering plate has an annular portion with an inner circumferential surface proximate the inner race outer circumferential surface. In an example embodiment, the stator assembly has a second blade plate with a slot. The first blade has a connecting portion with a tab having an upset portion that connects the flow guiding portion and the potted portion. The tab extends through the slot and the first and second blade plates are at least partially fixed by the upset portion.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
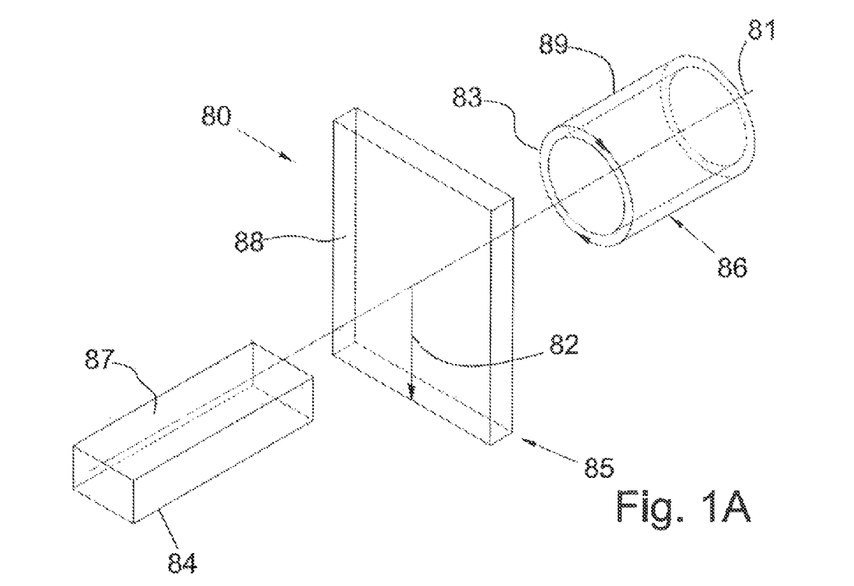
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
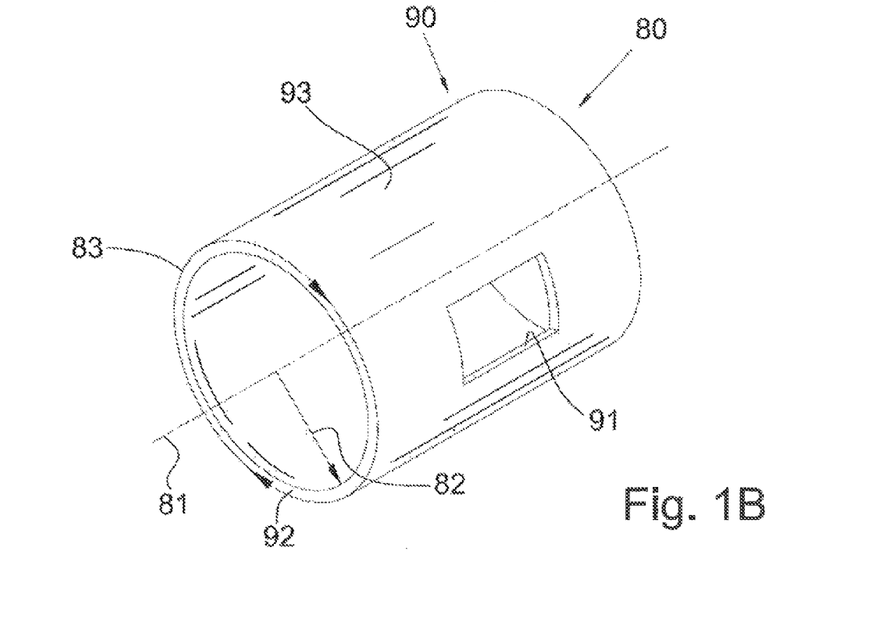
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
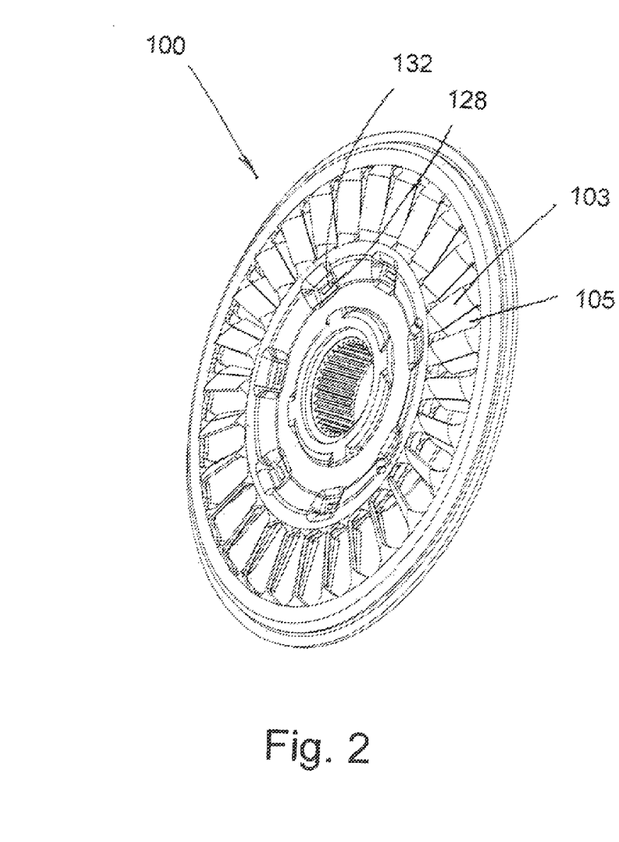
FIG. 2 is a perspective back view of a stator assembly according to an example aspect.
Figure 3:
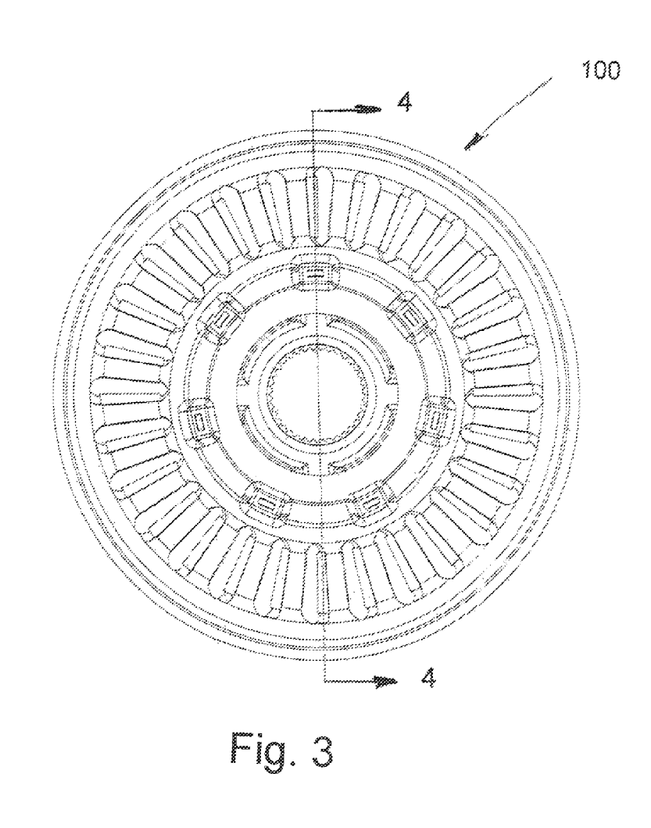
FIG. 3 is a back view of the stator assembly of FIG. 2.
Figure 4:
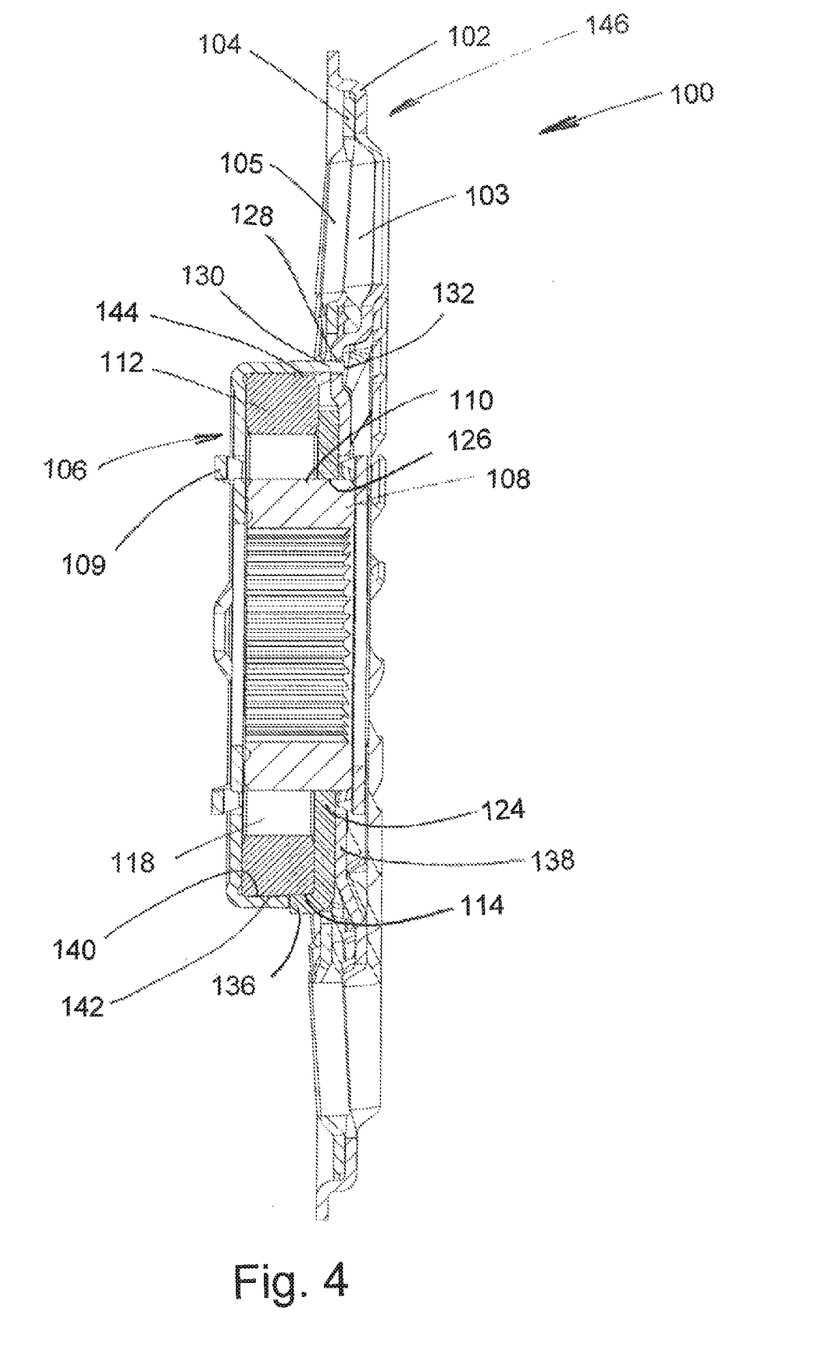
FIG. 4 is a section view of the stator assembly of FIG. 2 taken generally along line 4-4 in FIG. 3.
Figure 5:
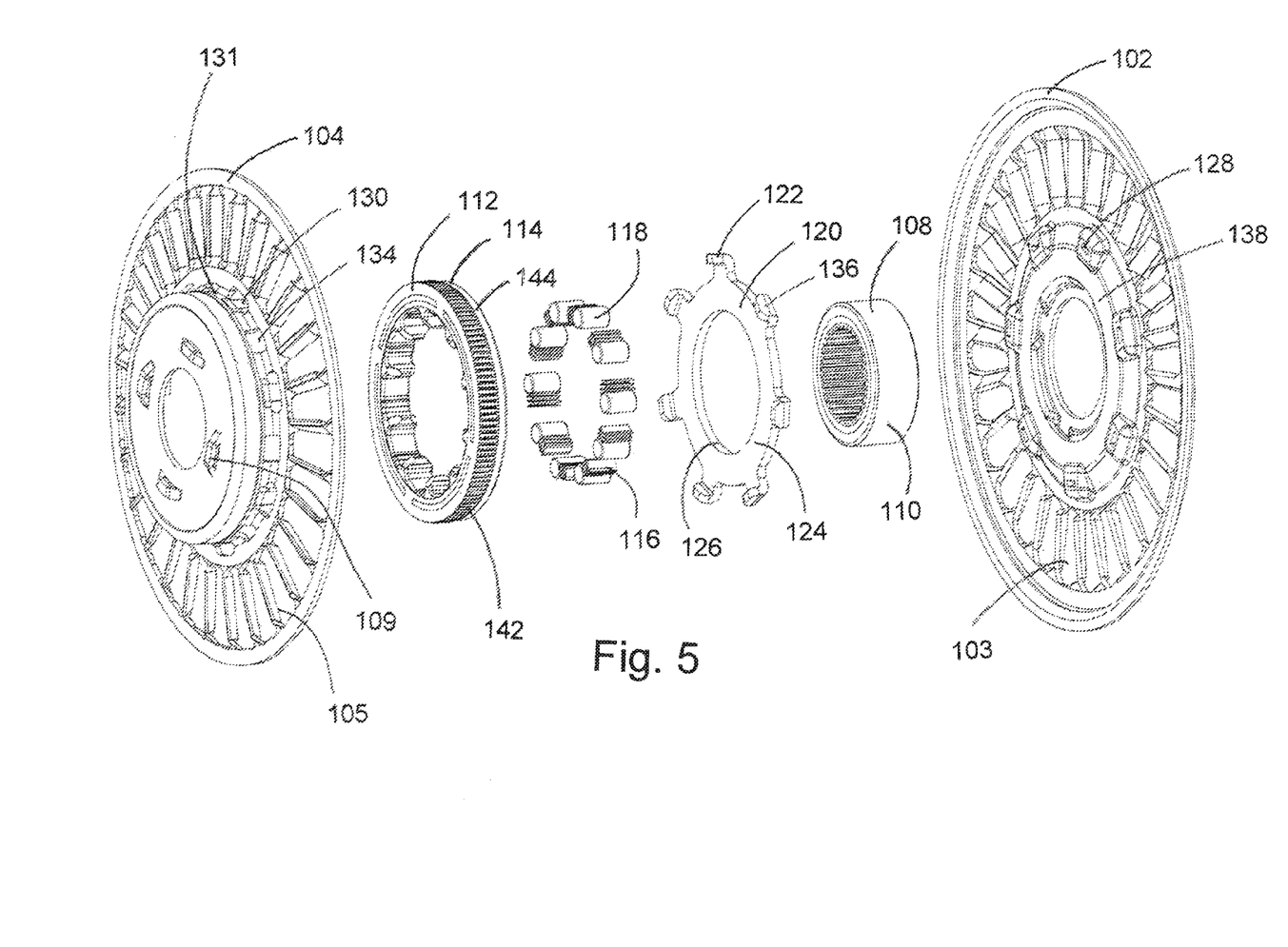
FIG. 5 is a front exploded view of the stator assembly of FIG. 2.
Figure 6:
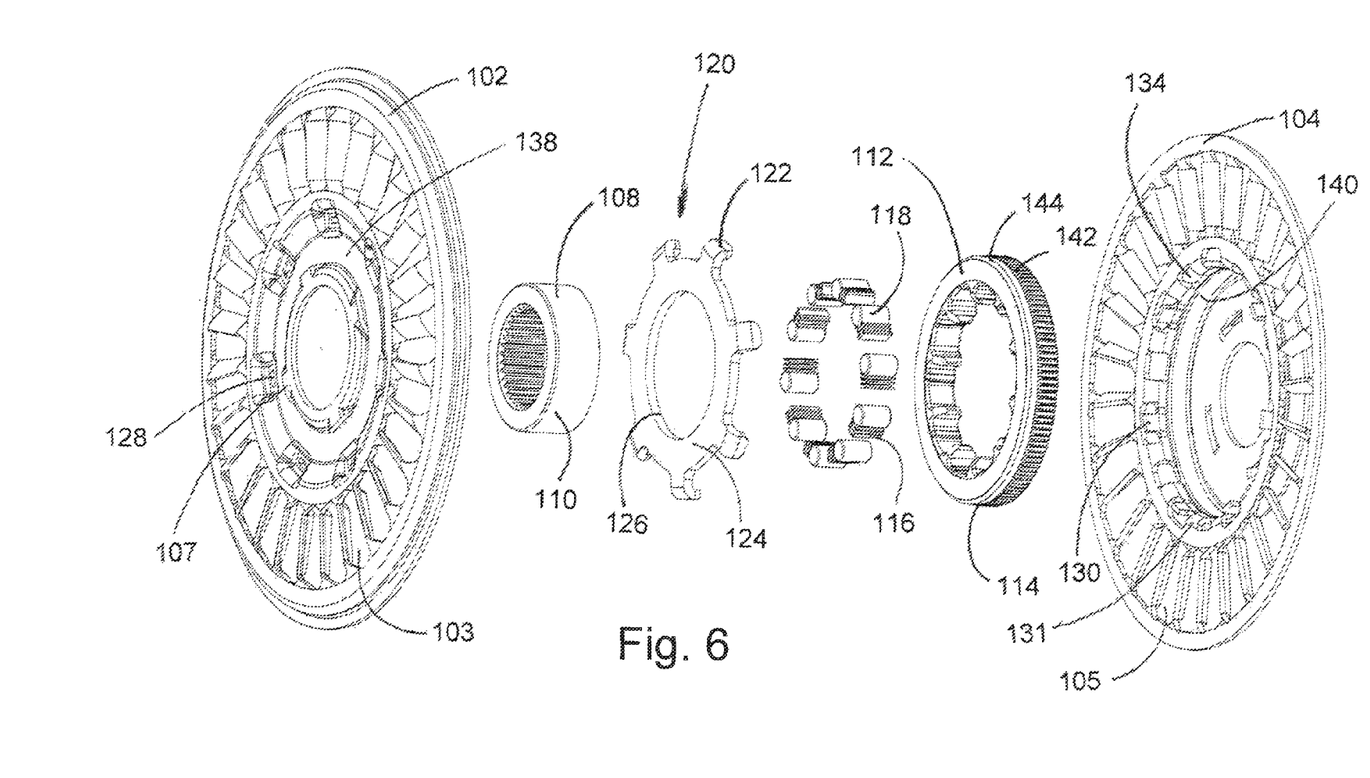
FIG. 6 is a back exploded view of the stator assembly of FIG. 2.

The following description is made with reference to FIGS. 2-6. FIG. 2 is a perspective back view of stator assembly 100 according to an example aspect. FIG. 3 is a back view of stator assembly 100 of FIG. 2. FIG. 4 is a section view of stator assembly 100 of FIG. 2 taken generally along line 4-4 in FIG. 3. FIG. 5 is a front exploded view of stator assembly 100 of FIG. 2. FIG. 6 is a back exploded view of stator assembly 100 of FIG. 2.

Stator assembly 100 is a stator assembly for a torque converter. Assembly 100 includes blade plates 102 and 104 and one-way clutch assembly 106 disposed axially between the blade plates. In an example embodiment, at least one of the blade plates 102 and 104 is made by stamping. Plates 102 and 104 include respective flow guiding portions, or blade segments, 103 and 105 for redirecting fluid flow in the torque converter. Blade plates 102 and 104 include respective axially extending segments 107 and 109 for positioning bearings (not shown) in the torque converter.

One-way clutch assembly 106 includes inner race 108 with outer circumferential surface 110, outer race 112 with outer circumferential surface 114, and blocking elements disposed radially between the inner race and the outer race. In the embodiment shown, the blocking elements are springs 116 and rollers 118. In other embodiments (not shown), the blocking elements may be springs and sprag elements.

Stator 100 also includes centering plate 120 with ring portion 122 and annular portion 124 with inner circumferential surface 126. In an example embodiment, plate 120 is made by stamping and circumferential surface 126 includes a shear length of at least seventy percent (70%). In some embodiments, centering plate 120 may be heat treated by ferritic nitrocarburizing, case hardening, or through hardening for improved wear resistance and/or reduced friction. Plate 120 may be made from aluminum and/or include grooves (not shown) in surface 126 for reduced friction and/or improved oil flow.

As can best be seen in FIG. 4, ring portion 122 is grippingly engaged with outer race circumferential surface 114. That is, portion 122 is tightly fit with surface 114 so that little or no radial movement is possible between portion 122 and surface 114. In other words, a radial position of outer race 112 is controlled by a precise fit between portion 122 and surface 114. Similarly, inner race outer circumferential surface 110 is arranged to radially position annular portion inner circumferential surface 126. That is, surface 110 is tightly fit with surface 126 so that little or no radial movement is possible between surface 110 and surface 126.

Blade plate 102 includes aperture 128, and blade plate 104 includes axial protuberance, or tab, 130 extending from connection portion 131 and disposed in the aperture (ref. FIG. 4). Although plate 102 includes the aperture and plate 104 includes the tab, other configurations of tabs and apertures are possible. For example, plate 102 may include the tab and plate 104 may include the aperture for receiving the tab. In an example embodiment, protuberance 130 includes deformed portion 132 arranged to fix the blade plates together. That is, after installing tab 130 into the aperture, portion 132 is deformed to prevent removal of tab 130 from aperture 128, thereby fixing plates 102 and 104 together.

In the embodiment shown in the figures, blade plate 104, and more specifically connection portion 131, includes notch 134 radially aligned and circumferentially offset from protuberance 130, and centering plate ring portion 122 includes tab 136 disposed in the notch. That is, because protuberance 130 and ring portion 122 share a common radius, portion 122 cannot be continuous because portions of the ring would interfere with the tab. In other embodiments (not shown), portion 122 and protuberance 130 may be disposed at different radii, and portion 122 may be a continuous ring. As seen in FIG. 4, outer race 112 is disposed axially between blade plate 104 and centering plate annular portion 124. Blade plate 102 includes radially extending portion 138, and centering plate annular portion 124 is axially retained by portion 138.

Blade plate 104 includes inner circumferential surface, or potted portion, 140. Portion 140 is connected to flow guiding portion 105 by connecting portion 131. Outer race circumferential surface 114 includes serrated portion 142 and non-serrated portion 144. By serrated, I mean that portion 142 includes radial "teeth" or peaks for material displacement during assembly with a mating part. Portion 142 is assembled with inner circumferential surface 140. To be more specific, portion 142 is press fit into surface 140. In other words, serrated portion 142 must be forced into surface 140 so that the serrations displace material such that plate 104 and race 112 are tightly locked together and drivingly engaged. Portion 144 is assembled with centering plate ring portion 124. Portions 124 and 144 are grippingly engaged, as described above. That is, plate 120, and specifically ring portion 144, is at least partially disposed around outer race outer circumferential surface 114.

Centering Plate 120 is shown as a stamped steel part which has an inner diameter 126 and outer tabs 122 sized to provide for proper centering of one way clutch outer race 112. In other example embodiments (not shown), tabs 122 are a solid, annular ring. Outer race 112 is pressed into tabs 122 of the centering plate and is therefore centered by them. Tabs 122 are shown in this embodiment instead of a solid ring because there are connection tabs 130 for connecting the two stator halves located at the same diameter as the centering tabs 122.

In order to provide improved centering, inner diameter 126 of the centering plate may be stamped with a minimum sheer length of seventy percent (70%). A minimum shear length can provide the proper surface and size required for a centering feature, thereby eliminating a secondary machining process. To improve wear resistance, centering plate 120 may be heat treated by any method known in the art. For example, plate 120 may be heat treated by ferritic nitro carburizing, case hardening, or through hardening. The inner diameter may include optional grooves (not shown) for oil lubrication of the interface between centering plate 120 and inner race 108.

The one-way clutch may be a roller one-way clutch with conventional springs 116 and rollers 118. Although shown as a roller one-way clutch, other example embodiments (not shown) may include a sprag one-way clutch as is commonly known in the art. The outer race 112 is pressed into the turbine side blade plate 104. During operation of the torque converter, thrust acting on plate 104 urges plate 104 towards race 112, reducing the likelihood of axial separation between plate 104 and race 112. That is, because the interface between plate 104 and race 112 is a press-fit connection without mechanical fasteners, race 112 is less likely to be "pressed out" of engagement with plate 104 in this configuration.

There are serrations 142 on the outside of the outer race which provide for torque transmission between the blade plate 104 and outer race 112. Blade plate 104 includes axial extensions 109 for centering a bearing (not shown) between a turbine (not shown) and stator 100, and blade plate 102 includes axial extension 107 for centering a bearing (not shown) between a pump (not shown) and stator 100. Pump side blade plate 102 is attached to turbine side blade plate 104 by tabs 130 which are formed out of the turbine side blade plate. These tabs are upset to fit tightly into slots 128 in the pump side blade plate. That is, the turbine side blade plate tabs are disposed in corresponding apertures in the pump side blade plate and expanded, similar to a conventional riveting operation. The resulting interface serves to radially position the plates relative to one another, and transmit torque between the plates. The two blade plates may also be joined by spot welds around the outer rims 146.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What I claim is:

1. A stator assembly for a torque converter comprising:
a first blade plate including an aperture;
a second blade plate including:
an axial protuberance disposed in the aperture; and,
a notch radially aligned with and circumferentially offset from the protuberance;
a one-way clutch assembly disposed axially between the blade plates and including:
an inner race including an outer circumferential surface;
an outer race including an outer circumferential surface; and,
a plurality of blocking elements disposed radially between the inner race and the outer race; and,
a centering plate including:
a tab disposed in the notch;
a ring portion grippingly engaged with the outer race outer circumferential surface; and,
an annular portion with an inner circumferential surface arranged to radially position the inner race outer circumferential surface; and,
wherein the outer race is disposed axially between the second blade plate and the centering plate annular portion.

2. The stator of claim 1 wherein at least one of the blade plates is made by stamping.

3. The stator of claim 1 wherein the protuberance includes a deformed portion arranged to fix the blade plates together.

4. The stator of claim 1 wherein the first blade plate includes a radially extending portion for axially retaining the centering plate.

5. The stator of claim 1 wherein:
the second blade plate includes an inner circumferential surface; and,
the outer race circumferential surface includes:
a serrated portion assembled with the second blade plate inner circumferential surface; and,
a non-serrated portion assembled with the centering plate ring portion.

6. The stator of claim 5 wherein the serrated portion is press-fit into the second blade plate inner circumferential surface.

7. The stator of claim 1 wherein the centering plate is made by stamping and the centering plate annular portion inner circumferential surface includes a shear length of at least seventy percent (70%).

8. The stator of claim 7 wherein the centering plate is heat treated by ferritic nitrocarburizing, case hardening, or through hardening.

9. The stator of claim 1 wherein the centering plate is made of aluminum.

10. The stator of claim 1 wherein the outer circumferential surface includes grooves.

11. The stator of claim 1 wherein the first and/or second blade plate includes at least a portion of a blade for guiding fluid in the torque converter.

12. The stator of claim 1 wherein the first and/or second blade plate includes an axially extending segment for positioning a bearing in the torque converter.

13. A stator assembly for a torque converter comprising:
a first stamped blade plate including a flow guiding portion;
a second stamped blade plate including a flow guiding portion and a circumferential surface including a notch;
a one-way clutch assembly disposed axially between the blade plates and including:
an inner race including an outer circumferential surface;
an outer race including an outer circumferential surface with a serrated portion pressed into the second blade plate circumferential surface, and a non-serrated portion; and, a plurality of blocking elements disposed radially between the inner race and the outer race; and, a stamped centering plate including:
  a plurality of ring tabs grippingly engaged with the outer race smooth portion and extending into the notch; and,
  an annular portion with a circumferential surface arranged to radially position the inner race circumferential surface.

14. The stator of claim 13 wherein the first blade plate includes an aperture and the second blade plate includes an axial protuberance extending from the circumferential surface and circumferentially offset from the notch, wherein the protuberance is disposed in the aperture and includes a deformed portion arranged to fix the blade plates together.

15. A stator assembly for a torque converter comprising:
  a first blade plate including a flow guiding portion and a potted portion;
  an inner race including an outer circumferential surface;
  an outer race including an outer circumferential surface press-fitted into the potted portion;
  a stamped centering plate at least partially disposed around the outer race outer circumferential surface;
  a plurality of blocking elements disposed radially between the outer race and the inner race wherein the centering plate includes an annular portion with an inner circumferential surface proximate the inner race outer circumferential surface; and,
  a second blade plate including a slot, wherein:
    the first blade plate includes a connecting portion having an axial tab with an upset portion;
    the connecting portion connects the flow guiding portion and the potted portion;
    the tab extends through the slot; and,
    the first and second blade plates are at least partially fixed by the upset portion.

16. The stator assembly of claim 15 wherein:
the first blade plate connecting portion includes notches; and,
the centering plate includes tabs at least partially disposed around the outer race outer circumferential surface and extending into the notches.

* * * * *